United States Patent [19]

Vennemeyer et al.

[11] Patent Number: 5,102,206
[45] Date of Patent: Apr. 7, 1992

[54] ANTI-LOCK BRAKING AND TRACTION CONTROL SYSTEM

[75] Inventors: Alfred C. Vennemeyer; Thomas H. Gardner, both of Englewood, Ohio

[73] Assignee: General Motors Corporation, Detroit, Mich.

[21] Appl. No.: 711,009

[22] Filed: Jun. 6, 1991

Related U.S. Application Data

[62] Division of Ser. No. 370,892, Jun. 26, 1989, Pat. No. 5,029,950.

[51] Int. Cl.$^5$ ............................................... B60T 8/32
[52] U.S. Cl. ........................... 303/113 TR; 303/119 R
[58] Field of Search .................. 303/100, 110, 115, 93, 303/113, 114, 119, 116, 61–63, 13–14, 105, 113 TR, 113 TB, 119 R, 115 All; 180/197; 188/181 A, 181 R, 162

[56] References Cited

U.S. PATENT DOCUMENTS

| | | | |
|---|---|---|---|
| 4,717,211 | 1/1988 | Dittner | 303/61 X |
| 4,929,037 | 5/1990 | Farr | 303/61 X |
| 5,026,126 | 6/1991 | Umasankar et al. | 303/100 |
| 5,029,950 | 7/1991 | Vennemeyer et al. | 303/100 |

Primary Examiner—Douglas C. Butler
Attorney, Agent, or Firm—Ernest E. Helms

[57] ABSTRACT

An anti-lock braking system (ABS) and traction control (TC) integration is provided including an actuator with fluid connections with a master cylinder, reservoir, and a wheel cylinder. A primary piston with an interior bore and a radial bore for selective alignment with the actuator fluid connections is slidably mounted in the actuator. A normally closed solenoid valve connects the reservoir with the actuator. A sensor determines wheel speed and generates a signal. The primary piston is moved along an actuator bore in response to the signal. The actuator also has a bore axial stop. A secondary piston is slidably mounted within the primary piston. The secondary piston has land surfaces forming a sealed chamber within the primary piston and a head section sealably mounted within the actuator bore exposed to the actuator connection with the wheel cylinder. The piston has an interior passage connecting the actuator connection with the wheel cylinder with the secondary piston sealed chamber.

1 Claim, 2 Drawing Sheets (1)

ANTI-LOCK BRAKING AND TRACTION CONTROL SYSTEM

This is a division of application Ser. No. 07/370892 filed June 26, 1989, now U.S. Pat. No. 5,029,950.

FIELD OF THE INVENTION

The field of the present invention is that of anti-lock braking systems (ABS) and traction control (TC) systems for automotive vehicles.

DISCLOSURE STATEMENT

Examples of an anti-lock braking system are provided in U.S. Pat. Nos. 4,653,815 and 4,756,391 commonly assigned.

SUMMARY OF THE INVENTION

The present invention provides an anti-lock braking system as an alternative to the systems described in the above-mentioned patents which also integrates a traction control system. Additionally, the present invention provides a traction control system wherein the motor utilized in the actuator can rotate in the same direction when being utilized for traction control or anti-lock braking system. In the anti-lock braking mode the motor will rotate in one direction to relieve pressure from the wheel cylinder and continue to rotate in the same given direction during the first pressure reapply after the system has entered into the anti-lock braking mode.

It is an object of the present invention to provide anti-lock braking system and traction control integration apparatus and method of utilization thereof.

Further objects and advantages of the present invention can become more apparent to those skilled in the art as the nature of the invention is better understood from the accompanying drawings and a detailed description.

DETAILED DESCRIPTION OF THE DRAWINGS

Figure 1:
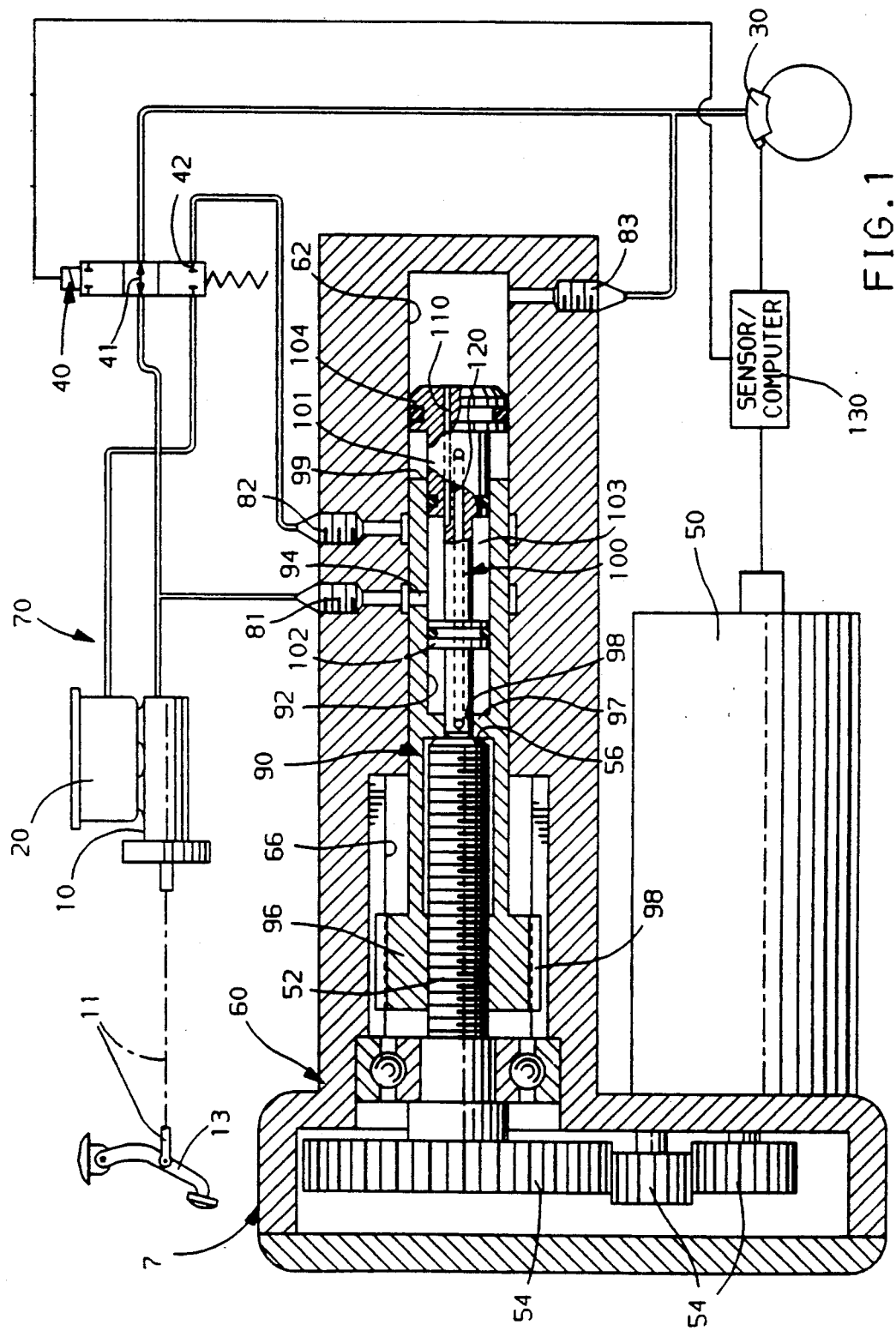
FIG. 1 is a sectional view with portions shown in schematic of a preferred embodiment anti-lock braking system traction control integration according to the present invention.

Referring to FIG. 1, the anti-lock traction control integration 70 of the present invention has a master cylinder 10. A brake pedal 13 is pivotally connected with a push rod 11 which controls operation of the master cylinder 10 in a conventional manner. The master cylinder has joined thereto a fluid reservoir 20. The master cylinder is also connected to the wheel brake cylinder 30 (Note: The wheel cylinder utilized in this application relates to disc brake calipers or to drum brake wheel cylinders.) via a dual line solenoid actuated valve means 40 having a normally open position for the connection between the master cylinder 10 the wheel cylinder 30. When activated the solenoid valve 40 will isolate the master cylinder 10 from the wheel cylinder 30.

An actuator 7 of the present invention is provided with movement means provided by a motor 50 typically electrically driven. The motor 50 is further operatively joined to an axially fixed screw or worm gear 52 by a plurality of intermediate gears 54.

The actuator 7 of the present invention is also provided with a housing 60. The housing has a central multi-diametered longitudinal bore 62. Intersecting the bore 62 is a first fluid connection 81 at a predetermined axial distance from the connection 81 is a second fluid connection 82. Axially spaced from the first 81 and second 82 connections typically along a blind end of the housing bore 62 is a third fluid connection 83.

The connection 81 is joined to the master cylinder 10. The connection 82 is joined with the solenoid valve 40. Upon energization of the solenoid valve 40 the second connection 82 is joined with the reservoir 20 via solenoid connection 42. In the normal braking mode the valve 40 prevents communication between connection 82 and the reservoir. The connection 83 is joined to the wheel cylinder 30.

Slidably mounted within the housing bore 62 and threadably engaged with the worm gear 52 is a primary piston 90. The piston 90 has an interior bore 92 with an intersecting radial bore 94. The bore 94 is provided for selective alignment with the first 81 or second 82 connections. The piston 90 as illustrated has an optional enlarged head section 96 for sliding engagement and alignment in a large diameter portion 66 of the interior bore 62. However, the housing enlarged section 96 portion typical will be vented. The piston 90 also has interior flange 97 with a central bore 98.

The enlarged section 96 as a tongue and groove type interconnection 98 with the large diameter portion 66 to prevent rotation of the piston 90 upon rotation of the worm gear 52.

Slidably mounted within the piston bore 62 is a secondary piston means 100. Piston 100 has a first 101 and second 102 landings which are sealably mounted (by captured O-rings) within the bore 92 forming a sealed chamber 103 therebetween. The piston 100 also has a head 104 section which is sealably mounted within the bore 62 and is fluidly exposed to the connection 83. A first interior passageway 110 connects the sealed chamber 103 with the head 104 of the piston 100. In an area adjacent to the head 104 but opposite the connection 83 is a second interior bore 120 providing a vent which extends beyond the second landing 102 which provides venting for the area beyond the second landing 102 to the area adjacent the head 104.

A sensor/computer means 130 is provided to sense the wheel speed and to generate a signal in response thereto. The sensor/computer 130 will signal the valve 40 and motor 50 to control actuator 7 in an ABS or TC modes as conditions mandates.

In the normal brake apply mode, the solenoid first passage 41 is normally open allowing direct fluid communication between the master cylinder 10 and the wheel cylinder 30. A second path of fluid communication is provided from the master cylinder 10 through the connection 81 into the bore 94 to the sealed chamber 103. Fluid then proceeds out the passageway 110 then proceeds past the head and out the connection 83 to the wheel cylinder 30. Therefore, in normal apply and in normal brake release, there are two fluid paths provided between the master cylinder 10 and the wheel cylinder 30. The piston 100 will be held by the stop means 56 provided by the end of the gear 52 because of the fluid pressure upon the head 104. (An optional light spring, not shown may be added to assist if desired.)

When an ABS condition is determined by the sensor/computer 130, a signal will be given to the valve 40 to energize, isolating the master cylinder 10 from the wheel cylinder 30. This is done to isolate normal brake path to eliminate pedal feel. The sensor/computer 130 will also signal motor 50 to rotate in a first predetermined angular direction to rotate the gear 52 in a first predetermined direction to advance the piston 90 towards the connection 83. The fluid pressure within the bore 62 adjacent the connection 83 will still maintain the piston 100 in a stationary position as the piston 90 has travel (to the right) in relation thereto. Upon initial movement of the piston 90 the bore 94 will come out of alignment with the connection 81, therefore, the master cylinder 10 is now additionally isolated from the wheel cylinder via the housing. Continued movement of the piston 90 will cause the bore 94 to come into alignment with the connection 82. The activation of the valve 40 has at the same time connected the reservoir 20 with the connection 82. When the bore 94 comes into alignment with the connection 82, fluid from the wheel cylinder 30 will be relieved into the reservoir 20 via the connection 83 and passageway 110 through and then out the bore 94 of the primary piston to the connection 82. (Note: Most ABS systems will mandate that there will be pressure in the wheel cylinder before 30 before ABS is initiated due to the vehicle operator stepping on the pedal 13.)

Typically, after the above described first release cycle in the ABS mode, the sensor/computer 30 will signal to again apply the brakes when the wheel speed picks up and skidding of the specified wheel (or wheels) has ceased. Thereupon, the motor 50 will continue to turn in the first predetermined angular direction urging the piston 90 in the same predetermined axial direction (towards the connection 83). The above movement will cause the bore 94 to come out of the alignment with the fluid connection 82. The space between the first 81 and second 82 connections typically will be the same as the space between an end 99 of the piston 90 and the head 104 of the secondary piston 100 in the normal brake apply mode. Therefore, as the piston 90 is continually moved forward, alignment of the bore 94 with the connection 82 be terminated and the piston 90 will contact the piston 100 (via the head 104) and will cause a pressure reapply. After the initial reapply the sensor/computer 130 will signal the motor 50 in such a manner to modulate the pressure within the wheel cylinder 30. (If desired, another portion of the piston 90 and piston 100 which will make contact can be altered. For instance, the flange 97 can contact the second landing 102 to move the piston 100.)

One of the great advantages of the actuator 7 is that the angular direction of the motor 50 and gear 52 and the axial travel of the piston 90 will be the same for the initial ABS release cycle and the initial reapply cycle. Since the directions are the same the actuator 7 does not suffer the time delay caused reversal in the direction of travel of the motor 50, gear 52 and piston 90. The inertia of the parts actually aids the integration to make the first ABS reapply faster. Approximately 60% better than that previously obtainable in a similar configuration wherein the motor 50 and gear 52 will have to stop and then be reversed between the initial ABS release and ABS pressure reapply cycles.

Another major advantage of the actuator 7 is that the valve 40 once cycled to the ABS mode is held, therefore, since the valve 40 is not cycled, as in many other ABS systems, response time can be maximized and design constraints mandated by transient flow rates between the opening and closing of the valve 40 are not nearly a greatest concern.

The actuator 7 works in substantially similar manner when utilized in a traction control mode. In the traction control mode the pressure within the wheel cylinder 30 is essentially equal to zero. The sensor/computer 130 sensing the wheel spin activates a signal for traction control and the valve 40 is actuated in the manner previously described. The motor 50 and will began rotation in the first predetermined angular direction to urge the piston 90 in the first axial direction as previously described. The alignment of the bore 94 with the connection 82 is of no significance since fluid pressure within the wheel cylinder 30 and the reservoir 20 are essentially equal, therefore, no flow condition will exist. Upon the continued forward travel of the piston 90 the piston 90 will make contact with the head 104 of the piston 100 and the first apply cycle of the traction control system will be manifested. Upon modulation of the traction control system, the motor 50 and gear 52 will be reversed. However, typically the reversal will be such that the secondary piston head 104 will still be maintained in contact with the end 94 of the primary piston.

In most applications the distance between the first 81 and second connections 81 will be the same as the distance between the primary piston end 99 and the secondary piston head 104 when the secondary piston 100 is held against the worm gear 52.

Figure 2:
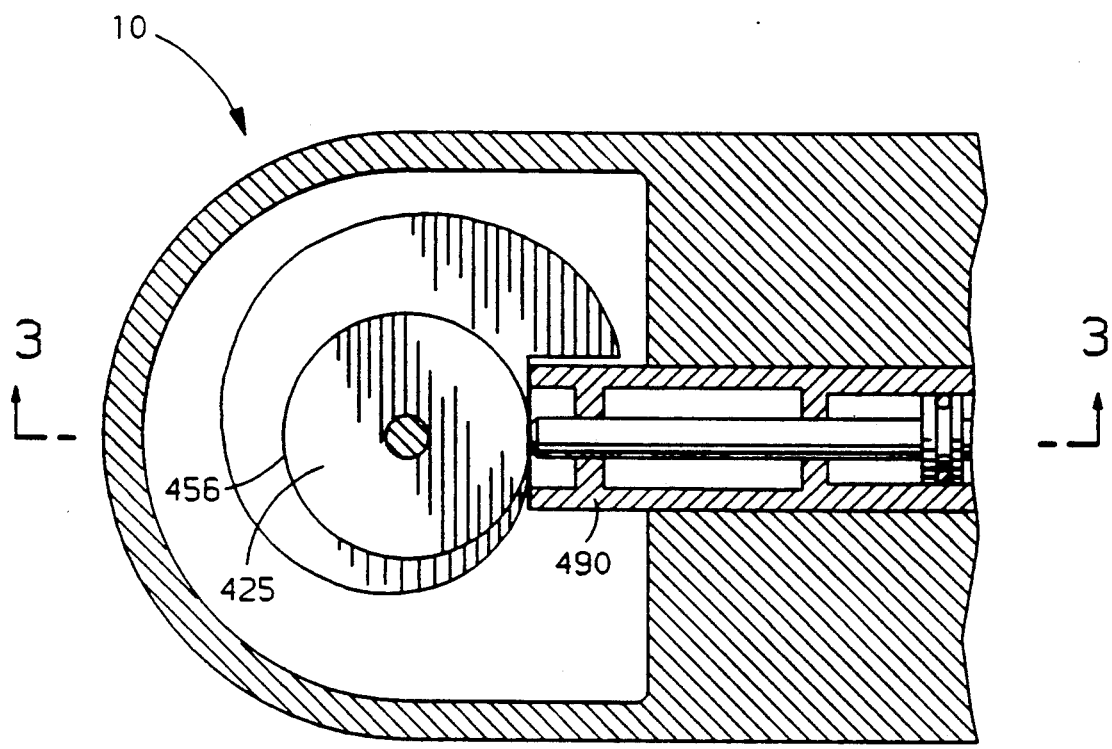
FIG. 2 is a partial view similar to that of FIG. 1 illustrating alternative preferred embodiments of the present invention.
Figure 3:
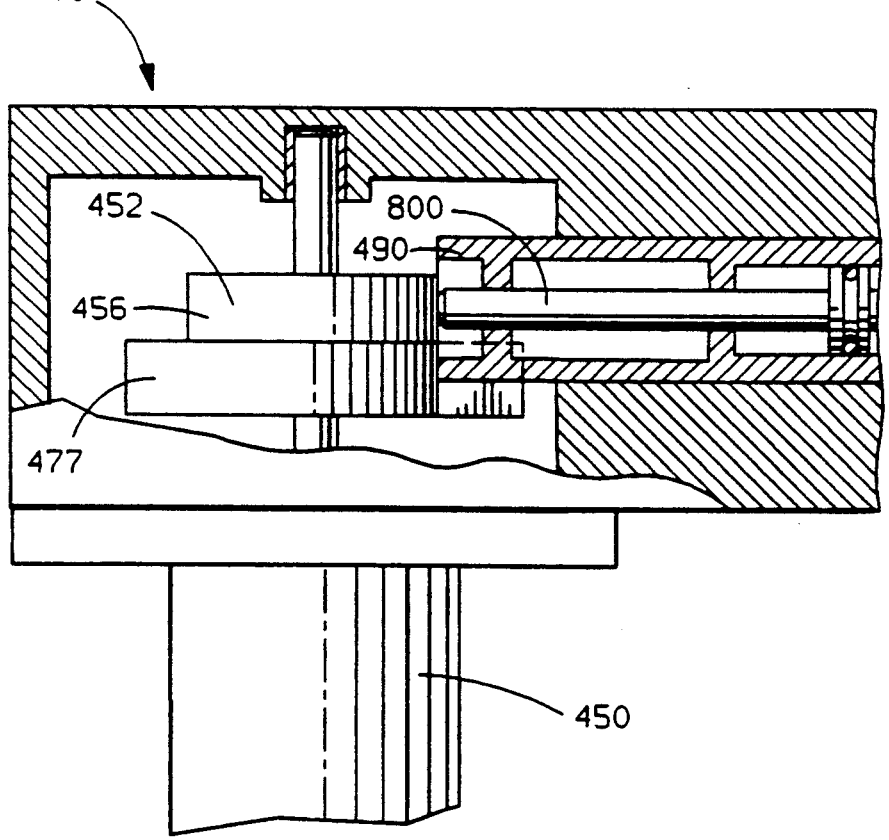
FIG. 3 is a view taken along line 3—3 of FIG. 2.

Referring additionally to modified embodiment of FIGS. 2 and 3, the actuator 10 as shown has a motor 450 joined with a cam actuator 452. Actuator 452 has a surface 477 which operably translates modified primary piston 490. Secondary piston 800 has an elongated stem which rest upon a circular stop 456 such that rotation of the cam surface of the cam 452 will not affect the location of the stop means 456 unless of course when the primary piston end, not shown, hits the head of the secondary piston as previously described. The remainder of the operation of actuator 10 is substantially as previously described for actuator 7.

While embodiments of the present invention have been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. An anti-lock braking system (ABS) and traction control (TC) integration for a vehicle with a master cylinder, a reservoir and a brake cylinder, said integration in combination comprising:
   an actuator housing with an interior bore with a first fluid connection for said master cylinder, a second fluid connection for said reservoir axially spaced from said first connection, and a third fluid connection for said brake cylinder axially spaced from said second fluid connection;
   a primary piston slidably mounted in said housing with an interior bore and a radial bore intersecting said interior bore of said primary piston for selective alignment with said housing first fluid connection and said housing second fluid connection and said primary piston having a contact surface;

a cam in contact with said contact surface of said primary piston powered by a motor for moving said primary piston;

means for providing an axial stop within said interior bore of said housing; and secondary piston means slidably mounted within said primary piston, said secondary piston means having land surfaces forming a sealed chamber within said primary piston and having a head section sealably mounted within said interior bore of said housing exposed to said housing third fluid connection, and said secondary piston means having an interior passage connecting said housing third fluid connection with said secondary piston means sealed chamber whereby when said integration is in a normal braking mode said secondary piston means is held against said means for providing an axial stop within said interior bore of said housing, and said housing first fluid connection fluidly communicates with said brake cylinder through said housing third fluid connection and in an ABS or TC mode, said primary piston is displaced in a first axial direction to align said radial bore with said second fluid connection, said primary piston is displaced further in said first axial direction to close fluid communication of said second fluid connection with said third fluid connection contacting said secondary piston head and displacing the same to reapply the pressure to said brake cylinder.

* * * * *